J. H. FAW.
MIRRORSCOPE FOR AUTOMOBILES OR OTHER VEHICLES.
APPLICATION FILED AUG. 24, 1916.
1,230,144.
Patented June 19, 1917.
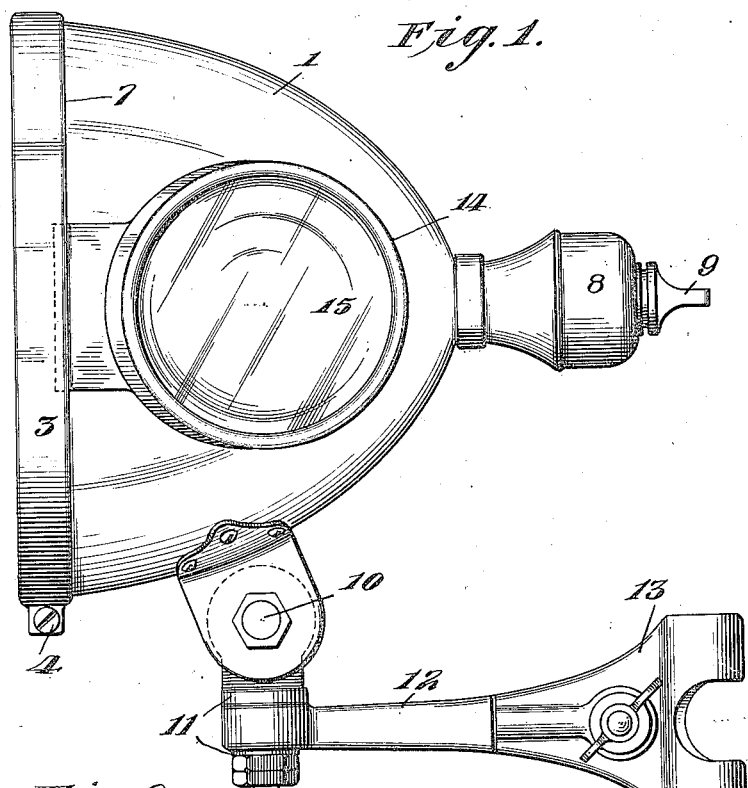
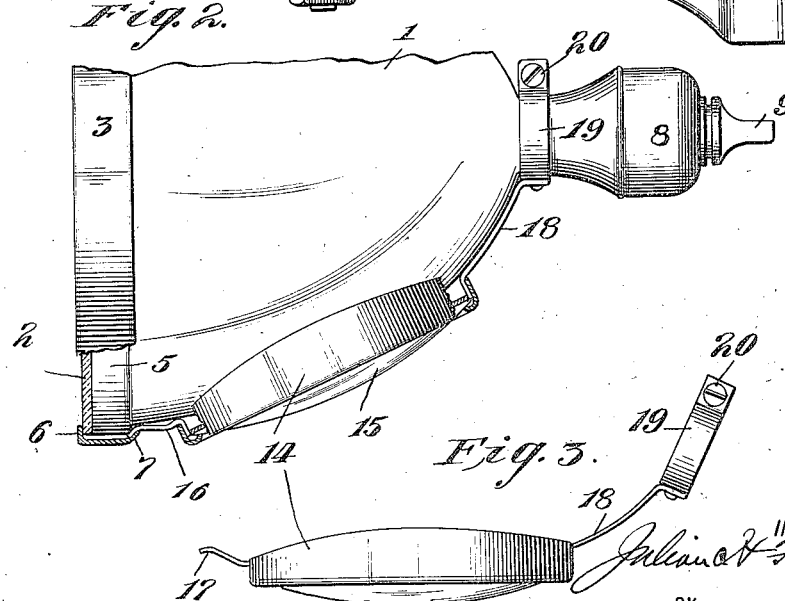

UNITED STATES PATENT OFFICE.

JULIAN H. FAW, OF NEW YORK, N. Y.

MIRRORSCOPE FOR AUTOMOBILES OR OTHER VEHICLES.

1,230,144.

Specification of Letters Patent.  Patented June 19, 1917.

Application filed August 24, 1916. Serial No. 116,579.

*To all whom it may concern:*

Be it known that I, JULIAN H. FAW, a citizen of the United States, a resident of the city, county, and State of New York, have invented certain new and useful Improvements in Mirrorscopes for Automobiles or other Vehicles, of which the following, taken in connection with the accompanying drawings, is a full, clear, and concise description.

My present invention relates to a mirror for automobiles and the like for showing rear traffic conditions and particularly to a mirror in the form of an attachment, capable of being expeditiously applied to the commonly used spotlight supported by and at the side of the windshield.

Referring to the accompanying drawings, in which I have illustrated preferable embodiments of my invention, Figure 1 is a view in side elevation of an automobile spotlight to which has been applied one form of my invention.

Fig. 2 is a top plan view of a fragmentary portion of the said lamp illustrated in Fig. 1, to which has been applied a modified form of my invention.

Fig. 3 is a view in side elevation of the mirror attachment shown in Fig. 2.

It has become customary to use mirrorscopes on automobiles, in order that the driver may be advised of the approach of faster moving vehicles from the rear. These mirrorscopes are attached to the side stanchion of the windshield by suitable clamping means. There are also extensively in use small electric search-lights, commonly referred to as spotlights, these being similarly mounted upon the windshield stanchion and so adjustably supported that the beam of light can be directed according to the desires of the driver. Both of the described devices are mounted on that side of the windshield which is nearest the driver and by reason of their size more or less obstruct and interfere with the driver's vision, particularly when approaching intersecting streets. To minimize the objectionable features alluded to, so as to make driving more safe is the purpose of my invention. This I accomplish by combining the mirrorscope and the spotlight in a simple and inexpensive manner, so that both devices may be utilized for their intended and respective purposes, to the fullest advantage.

Referring to the drawings, 1 indicates the casing of a search-light of the well-known parabolic type, 2 is the front glass or crystal, 3 represents the bezel or retaining ring, the free ends of which are clamped as at 4, in a well-understood manner. This bezel or retaining ring conforms to and closely fits an enlargement 5 formed in the outer rim portion of the casing 1. The flange 6 of the bezel fitting against the glass 2 and serving to retain it in place, while the opposite circumferential rim portion 7 is inwardly directed to engage the adjacent wall of the enlargement 5.

A knob or handle 8 is arranged at the rear of the lamp for convenience of use and a switch member 9 is located centrally of this handle for the same purpose. The lamp is pivoted at 10 by a swivel connection 11, carried by an arm 12, the latter being provided with the fastening means 13, whereby the device may be mounted as a whole upon the windshield stanchion.

My mirror attachment comprises a casing or holder 14 holding the mirror 15 which in the illustrated embodiment is of the convexly curved type, which reduces the image reflected. The back or rear portion of the casing 14 is curved or shaped to conform to the curvature of the lamp casing, so that when it is mounted upon the lamp, the mirror will assume a vertical position. To fasten the mirror to the spotlight, I provide a projecting tang 16, one end of which is fastened to or formed integral with the mirror casing 14, while the opposite or free end is bent up as at 17 and clamped beneath the inwardly extending circumferential edge of the bezel 6 of the lamp and between it and the casing proper so that when the clamping means 4 of the bezel has been properly tightened and adjusted, the mirror will be properly and securely held in place upon the side of the lamp casing. In order to provide additional securing means, if such is found to be desirable, I may provide a rearwardly extending arm 18, the free end of which may be provided with a clamping member 19, adapted to straddle or encircle the reduced portion of the handle 8, at the rear of the lamp, and which may be securely and rigidly attached thereto by means of the screw bolt 20.

It will be observed from the foregoing that the mirror is detachably and adjustably mounted upon the lamp casing. The fact of its being detachable from the lamp casing makes possible its removal in case of repairs being required, thus eliminating the necessity of shipping the lamp itself to the factory. As a result of this, the lamp can be retained in use until the repairs have been made. Furthermore, the detachable and adjustable feature makes possible the use of the mirror on any portion of the peripheral surface of the lamp casing, thus it is possible to mount and use the spotlight on either left or right side of the windshield by which it is usually supported. A further advantage attained by having the mirror adjustable resides in the fact that the spotlight can be mounted at different heights upon the windshield without impairing the usefulness of the mirror, as the mirror can be adjusted to a proper angular location on the shell of the spotlight with relation to its axis after the spotlight has been mounted on the windshield support. These advantages would not be obtained if the mirror were permanently mounted on the lamp in which case it would be practically impossible to use the lamp on either side of the windshield and the mirror could not be finally adjusted to the desired focal position after the lamp had been attached to its support.

While I have illustrated certain preferable constructions in which my invention may find embodiment, I do this by way of example only, as other ways of attaching the mirror to the lamp casing may be used to advantage without departing from the spirit and scope of my invention as defined in the appended claims.

Having thus described my invention, I claim:

1. The combination with an automobile spotlight including a lamp casing, of a rear-view mirror, means for detachably securing said mirror upon the outer peripheral surface of the lamp casing, said means permitting the adjustment of said mirror annularly of the lamp casing to various angular locations with relation to the axis of the light.

2. The combination with a spotlight having a convexly-curved shell, of a rear-view mirror detachably and adjustably secured thereto, said mirror having an annular casing, the inner periphery of which conforms in curvature to the curvature of the spotlight shell.

3. In combination with an automobile spotlight having a convexly-curved shell, of a convexly-curved mirror mounted upon and coincident with said shell and means for detachably and adjustably securing the mirror to the shell, whereby the mirror may be adjusted annularly of the shell.

4. The combination with an automobile spotlight having a removable bezel, of a rear-view mirror adjustably secured thereto by a flange adapted to be received between the bezel and lamp casing.

5. In combination with an automobile spotlight provided with a handle, a detachable rear-view mirror, means for adjustably mounting said mirror upon the lamp casing, said means including a clamp adapted to encircle and be clamped around the lamp handle.

6. The combination with an automobile spotlight having a removable bezel, of a rear-view mirror detachably and adjustably secured thereto, said mirror being provided with diametrically opposite extensions adapted to be detachably secured to opposite portions of the lamp, one of said extensions being engaged by the bezel.

7. The combination with an automobile spotlight, of a rear-view mirror fitted adjustably upon one side thereof, said mirror being provided with front and rear extensions which adjustably engage front and rear portions, respectively, of the lamp body, to admit of the mirror being annularly shifted upon the lamp about the axis thereof.

JULIAN H. FAW.